Patented Jan. 15, 1952

2,582,613

UNITED STATES PATENT OFFICE 2,582,613

PRODUCTS OBTAINED FROM A POLY-
ETHYLENE MELAMINE

Henry P. Wohnsiedler, Darien, and Edward L.
Kropa, Old Greenwich, Conn., assignors to
American Cyanamid Company, New York, N. Y.,
a corporation of Maine No Drawing. Application November 25, 1950,
Serial No. 197,638

17 Claims. (Cl. 260—47)

This invention relates to the production of new synthetic materials and, more particularly, new resinous (or potentially resinous) compositions which are especially suitable for use in the plastics and coating arts. Still more particularly the invention is concerned with compositions comprising the product of reaction of ingredients comprising (1) a polyethylene melamine (diethylene melamine or triethylene melamine) and (2) a non-nitrogenous, hydroxy compound which contains carbon having bonded directly thereto at least one and not more than six hydroxy groups per molecule, for instance methanol, ethanol, propanol, the glycols (e. g., ethylene glycol, diethylene glycol, triethylene glycol, etc.), glycerol, pentaerythritol, sorbitol, mannitol, ethylene glycol monoethyl ether, phenol, resorcinol, etc., or mixtures thereof, e. g., a mixture of a monohydric alcohol and a polyhydric alcohol containing not more than six alcoholic hydroxyl groups, a mixture of a phenol (e. g., phenol itself, o-, m- or p-cresol or mixtures thereof, a xylenol, an ethylphenol, etc.) and a monohydric alcohol and/or a polyhydric alcohol containing not more than six alcoholic hydroxyl groups, as well as other mixtures of hydroxy compounds of the kind aforementioned. The hydroxy component of the hydroxy compound of (2) is the only substituent of the said compound which is reactive with the aforesaid polyethylene melamine. Instead of diethylene melamine or triethylene melamine alone, a mixture of these polyethylene melamines in any proportions can be used as the reactant with the hydroxy compound of (2). The scope of the invention also includes method features.

Triethylene melamine is a known compound and can be prepared, for example, by the method described in Wystrach and Kaiser Patent No. 2,520,619. It can be represented by the following general formula:

I 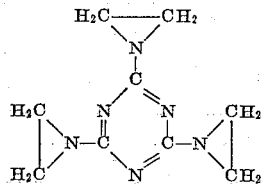

Diethylene melamine can be represented by the following formula:

II 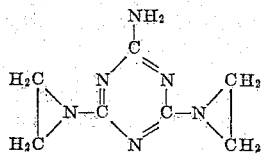

It can be prepared, for instance, as described in the copending application of Donald W. Kaiser and Frederic Schaefer, Serial No. 165,861 filed June 2, 1950. The polyethylene melamines employed in practicing the present invention may be described as being s-triazine (1,3,5-triazine) derivatives wherein at least two of the amino nitrogen atoms of a polyamino-s-triazine each has one ethylene group attached thereto instead of the two hydrogen atoms.

It is an object of the present invention to prepare a new class of synthetic materials, more particularly resinous compositions, which have particular utility in the plastics and coating arts, e. g., as coating, laminating, adhesive, impregnating, casting and molding compositions as well as in other applications, for instance in the treatment of textiles, paper, etc. They also can be used as components of plastics and coating compositions. Other objects of the invention will be apparent to those skilled in the art as the description of the invention proceeds.

The present invention is based on our discovery that new and valuable materials for use in coating, molding and other applications can be prepared by effecting reaction between ingredients comprising (1) diethylene melamine and/or triethylene melamine and (2) a non-nitrogenous, hydroxy compound having bonded directly thereto at least one and not more than six hydroxy (hydroxyl) groups per molecule. The hydroxy compound can be one which has a single hydroxy group bonded directly to a carbon atom thereof, or one which contains carbon having bonded directly thereto at least two and not more than six hydroxy groups per molecule. In their monomeric form or when polymerized only to a relatively low degree or extent, the new reaction products of this invention generally are soluble, but become insoluble upon further advancement of polymerization, that is, become substantially completely cured. Some of the synthetic compositions of this invention, as initially prepared, are thermosetting in nature and can be cured under heat in the form of films or moldings without the aid of a curing catalyst. The principal reaction which seems to take place between the polyethylene melamine and the hydroxy compound which is reacted therewith, for instance, an alcohol represented by the formula R—OH, where R represents a monovalent hydrocarbon radical (e. g., methyl, ethyl, allyl, 2-butenyl, octadecyl, octadecenyl, phenyl, benzyl, tolyl, cyclohexyl, cyclohexenyl, etc.), appears to be one of addition both in the formation of the monomeric product as well as in the formation of the polymer. Contrary to expectations, an addition reaction is not the only one which seems to take place since volatile products are formed under certain conditions, indicating that other mechanisms also may explain the reaction. It also appears that the polyethylene melamines undergo self-polymerization similar to that in a vinyl-type polymerization, and this latter type of reaction may compete with the aforementioned addition reaction.

The proportions of the reactants can be widely varied depending, for example, upon the particular properties desired in the final product, the rapidity with which it is desired that the reaction should proceed, and other influencing factors. Thus, the reactants can be used in approximately stoichiometrical proportions or with the one somewhat (e. g., from 0.05% to 10 or 20%) in stoichiometrical excess over the other. Or, the reactants can be used in approximately equi-molecular proportions or in molar proportions ranging from 1:10 to 10:1, more particularly from 1:2 or 3 to 2 or 3:1. Or, for certain purposes, for instance in the production of coating, laminating and impregnating compositions, a much larger excess of hydroxy compound (especially those which are normally liquids) can be employed, e. g., 15 or 20, or even 30 or 40 or more moles of hydroxy compound per mole of polyethylene melamine. Thus, the hydroxy compound can be used in an amount such that the solid reaction product constitutes from about 10% to about 35 or 40%, preferably from about 15% to about 25% or 30%, by weight of the total reaction mass. The excess hydroxy compound functions as a medium in which the reaction is effected.

The temperature of the reaction also can be widely varied depending, for instance, upon the particular reactants employed, the rapidity of reaction wanted, the particular properties desired in the reaction product, and other factors. For example, the reaction temperature can be varied from room temperature (20°-30° C.) up to and including the fusion or boiling temperature of the reaction mixture if the reaction is carried out in the absence of an active or inert liquid medium, or up to and including the boiling point of the reaction mass if the reaction is effected while the primary reactants are dissolved or suspended in such a liquid medium. The temperature is preferably controlled or regulated so that the maximum temperature of reaction is below the temperature of decomposition of the reaction product.

The reaction can be effected in the absence of a solvent or other additive, or in the presence of (i. e., intimately associated with) an inert solvent (e. g., benzene, toluene, xylene, dioxane, acetone, ethyl methyl ketone, methyl isobutyl ketone, chlorobenzene, chloroform, ethylene dichloride, etc.), or in the presence of an active liquid medium, that is, one which is capable of entering into the reaction, more particularly with the polyethylene melamine reactant, for instance, mono-, di- and triethanolamines, propylamine, dipropylamine, isopropylamine and other active, liquid amines, numerous examples of which are given in our copending application Serial No. 197,637, filed concurrently with the present application; as well as numerous others that will be apparent to those skilled in the art. The inert or active liquid medium or additive, if employed, can be used in any suitable amount ranging, for instance, from 0.02 to 40 or 50 times that of the weight of the primary reactants. Good results have been obtained when the inert or active liquid medium was employed in an amount such that the primary reactants constituted from about 20% to about 30 or 35% by weight of the reaction mass. At the end of the reaction period, the inert or unreacted liquid medium can be removed in whole or in part, if desired, from the reaction mass by any suitable means, for example by distillation, decantation, etc., or the solid reaction product can be separated from the liquid component of the reaction mass by filtration, centrifuging, etc.

In order that those skilled in the art better may understand how the present invention can be carried into effect, the following examples are given by way of illustration and not by way of limitation. All parts and percentages are by weight.

EXAMPLE 1

*Reaction of triethylene melamine and methyl alcohol*

|  | Parts |
|---|---|
| Triethylene melamine | 150 |
| Methyl alcohol | 450 | were heated together under reflux with stirring, being brought to initial reflux in 4 minutes. Refluxing was continued for about 2 hours and 20 minutes, yielding a clear solution which formed clear and tack-free films on drying. The solution tolerated more than 25 cc. of water or of methyl alcohol per cc. of solution without separation of solids. A sample taken from the reaction mass 20 minutes before the end of the total reflux period dried in spot tests to a viscous, balsam-like product in 1½ hours and to a tacky resin in about 16 hours.

The solution comprising the triethylene melamine-methyl alcohol reaction product can be used as a coating composition or as a component of such compositions.

EXAMPLE 2

*Reaction of triethylene melamine and ethyl alcohol*

|  | Parts |
|---|---|
| Triethylene melamine | 150 |
| Ethyl alcohol | 450 |

The same general procedure was followed as described in Example 1, the total period of heating under reflux at boiling temperature (79°-80° C.) being 93 minutes. The solution comprising the ethyl alcohol-triethylene melamine reaction product dried to a frosty film.

EXAMPLE 3

*Reaction of triethylene melamine and ethylene glycol*

|  | Parts | Approx. Molar Ratio |
|---|---|---|
| Triethylene melamine | 41.5 | 2 |
| Ethylene glycol | 18.9 | 3 | were mixed and gently heated in an open reaction vessel. Slight ebullition occurred at the beginning of the period (before melting of the mixture was complete), but the reaction did not continue. Further warming led first to a water-white, fluid melt and then to an instantaneous reaction with the evolution of a large volume of vapor. The reaction product was a porous, earth-colored solid.

EXAMPLE 4

Reaction of triethylene melamine and ethylene glycol

| | Parts |
|---|---|
| Triethylene melamine | 88 |
| Ethylene glycol | 190 |

The ethylene glycol and a little less than about one-half of the total amount of triethylene melamine were heated together in an open reaction vessel. The triethylene melamine gradually dissolved, but no other change occurred as an indication or evidence of reaction. The remainder of the triethylene melamine was then added, whereupon there was an immediate reaction between the ingredients, as evidenced by the formation of a soft, water-white gel accompanied by slight ebullition and increased evolution of vapor. The temperature of the reaction mass at this point was about 95° C. Heating was then continued, the temperature rising gradually to 200° C. and some yellowing of the mass occurring. At the higher temperature, part of the product was still in the form of a soft, water-white gel but the main portion appeared to be harder than the rest.

EXAMPLE 5

Reaction of triethylene melamine and ethylene glycol

| | Parts | Approx. Molar Ratio |
|---|---|---|
| Triethylene melamine | 20.8 | 2 |
| Ethylene glycol | 9.5 | 3 |
| Chlorobenzene | 221.3 | | were heated together under reflux at the boiling temperature of the mass for 75 minutes, yielding a partly clear gel. The gelatinous mass was transferred to another vessel, which was heated on a steam bath for about 1 hour to evaporate the solvent. The dried reaction product was light cream-colored, pulverulent and somewhat resinous. A sample of the finely ground product was formed into a disk by molding for 5 minutes at about 150° C. under a pressure of about 4000 pounds per square inch. The molded piece was flexible. Upon standing in air having a high humidity, increased toughness appeared to be imparted to at least part of the disk.

EXAMPLE 6

Reaction of diethylene melamine and ethylene glycol monoethyl ether

| | Parts | Approx. Molar Ratio |
|---|---|---|
| Diethylene melamine | 30 | 1.0 |
| Ethylene glycol monoethyl ether | 100 | 6.6 | were heated together in an open reaction vessel, which was immersed in an oil bath, to a temperature of 197° C. at which point a gelled reaction product of the diethylene melamine and ethylene glycol monoethyl ether was obtained. After standing for about 16 hours, the gel dispersed.

EXAMPLE 7

Reaction of diethylene melamine and ethylene glycol

| | Parts | Approx. Molar Ratio |
|---|---|---|
| Diethylene melamine | 30.0 | 1 |
| Ethylene glycol | 10.5 | 1 |
| Dioxane | 100.0 | |

The same procedure was followed as was described under Example 6 with the exception that the mixture of the ingredients was heated for 2 hours at a bath temperature of 165° C. At the end of this period of time, a gelled reaction product was obtained. When the reaction mass was heated at a higher temperature, the product did not fuse on a Dennis bar up to 194° C.

EXAMPLE 8

Reaction of diethylene melamine and hexanol

| | Parts | Approx. Molar Ratio |
|---|---|---|
| Diethylene melamine | 30.0 | 1 |
| Hexanol | 17.2 | 1 | were heated together to 197° C. over a period of 3 hours, yielding a composition comprising a reaction product of diethylene melamine and hexanol.

EXAMPLE 9

Reaction of diethylene melamine and allyl alcohol

| | Parts | Approx. Molar Ratio |
|---|---|---|
| Diethylene melamine | 30.0 | 1 |
| Allyl alcohol | 19.6 | 2 | were heated together in an open reaction vessel over a period of 2 hours to a temperature of 165° C., at which point an instantaneous reaction between the reactants took place, yielding a hard mass of reaction product.

EXAMPLE 10

Reaction of diethylene melamine and triethylene glycol

| | Parts | Approx. Molar Ratio |
|---|---|---|
| Diethylene melamine | 30.0 | 1 |
| Triethylene glycol | 25.3 | 1 |

A mixture of the above ingredients was heated in an open reaction vessel for 37 minutes to a temperature of 125° C., yielding an amber-colored gel at the end of this reaction period.

EXAMPLE 11

Reaction of diethylene melamine and hexamethylene glycol

| | Parts | Approx. Molar Ratio |
|---|---|---|
| Diethylene melamine | 30.0 | 1 |
| Hexamethylene glycol | 19.9 | 1 |
| Dioxane | 100.0 | |

A mixture of the foregoing ingredients was heated for 2 hours in an open reaction vessel placed in an oil bath which was slowly raised to a temperature of 165° C. At the end of this period of time an amber-colored gel was formed.

EXAMPLE 12

Reaction of diethylene melamine and glycerol

|  | Parts | Approx. Molar Ratio |
|---|---|---|
| Diethylene melamine | 30.0 | 1 |
| Glycerol | 15.5 | 1 |

The same procedure was followed as described under Example 10. After the mixture of ingredients had been heated for 37 minutes at an oil bath temperature of 125° C., an instantaneous reaction took place with the formation of an amber-colored, gelled reaction product.

EXAMPLE 13

Reaction of diethylene melamine and phenol

|  | Parts | Approx. Molar Ratio |
|---|---|---|
| Diethylene melamine | 30.0 | 1 |
| Phenol | 15.9 | 1 |
| Dioxane | 100.0 |  | formed a uniform, viscous, amber-colored resin after being heated together for 2 hours at a slowly increasing temperature up to 165° C. This resin was isolated and was found to be non-hardening when heated to 197° C. over a period of 10 minutes. Upon further heating to 243° C., the resin became fluid and a phenolic odor was noted. This resin can be used as a modifier of other synthetic resins to improve their plasticity or flow characteristics.

EXAMPLE 14

Reaction of diethylene melamine and cyclohexanol

|  | Parts | Approx. Molar Ratio |
|---|---|---|
| Diethylene melamine | 30 | 1 |
| Cyclohexanol | 100 | 6 |

The above ingredients were heated together, the temperature being raised to 127° C. in 67 minutes, whereupon the mass thickened. It was then heated to 197° C. in 1¾ hours. On cooling, the reaction product comprised a thermoplastic resin.

EXAMPLE 15

Reaction of diethylene melamine and resorcinol

|  | Parts | Approx. Molar Ratio |
|---|---|---|
| Diethylene melamine | 30.0 | 2 |
| Resorcinol | 9.3 | 1 |
| Water | 100.0 |  | were heated together in an open reaction vessel placed in an oil bath which initially was at a temperature of 110° C. After heating to a bath temperature of 122° C. over a period of 15 minutes, a small amount of the diethylene melamine dissolved. After an additional 10-minutes' heating period at the same temperature, the remaining insoluble ingredients coalesced. Upon heating for another 30 minutes to 125° C., the coalesced solids became harder and formed a thermoplastic resin.

EXAMPLE 16

Reaction of diethylene melamine, p,p'-dihydroxydiphenyldimethylmethane and ethylene glycol monoethyl ether

|  | Parts | Approx. Molar Ratio |
|---|---|---|
| Diethylene melamine | 30.0 | 2 |
| p,p'—Dihydroxydiphenyl dimethylmethane | 19.2 | 1 |
| Ethylene glycol monoethyl ether | 100.0 |  |

The same procedure was followed as described under Example 15, a clear solution being formed after they had been heated together for 1¼ hours to a maximum oil bath temperature of 144° C. When portions of the resulting solution were cast to form films, hard films were obtained after heating for 3 hours at 65° C. and then for 1½ hours at 105° C. Similar results were obtained by heating for 1½ hours at 150° C.

EXAMPLE 17

Reaction of triethylene melamine, pentaerythritol and ethyl alcohol

|  | Parts | Approx. Molar Ratio |
|---|---|---|
| Triethylene melamine | 150 | 2 |
| Pentaerythritol | 50 | 1 |
| Ethyl alcohol | 600 | 26 | were heated together under reflux at the boiling temperature of the mass for 30 minutes, at the end of which period about 10.7 parts of n-butyl amine was added as a catalytic reactant to accelerate the reaction. Refluxing was continued for another 70 minutes, yielding a solution which contained a small amount of insoluble matter. The solids were removed from the solution by pressure filtration. Panels were coated with the clear solution, and the coated panels were baked for 1½ hours at 105° C. in one case, and at 120° C. for the same length of time in another case. In both instances hard films were obtained. The film resulting from baking at the lower temperature was more flexible than the other, and did not crack when wound about a ¾-inch mandrel. The 120° C.-baked film showed better resistance to water after immersion therein for 4 hours at room temperature as compared with the 105° C.-baked film.

EXAMPLE 18

Reaction of triethylene melamine, hexamethylene glycol, ethyl alcohol and n-butyl amine

|  | Parts | Approx. Molar Ratio |
|---|---|---|
| Triethylene melamine | 150.0 | 1.0 |
| Hexamethylene glycol | 87.0 | 1.0 |
| Ethyl alcohol | 750.0 | 32.6 |
| n-Butyl amine (catalytic reactant) | 10.7 | 0.2 |

All the above ingredients were mixed together, and the resulting mixture was heated under reflux at boiling temperature for 65 minutes. After refluxing for 55 minutes a sample of the solution was clear on cooling, as was also the final reaction mass. This solution was stable on standing for at least 1 month. Films produced by baking as described under Example 17 showed good hardness characteristics. The films baked at both 105° C. and 120° C. had good flexibility and did not crack when wound about a ½-inch mandrel. In this example, too, the film that had been baked at 120° C. showed better resistance to water after immersion therein for 4 hours at room temperature as compared with the 105° C.-baked film.

EXAMPLE 19

*Reaction of triethylene melamine, pentaerythritol and ethyl alcohol*

The same proportions of triethylene melamine, pentaerythritol and ethyl alcohol were used as in Example 17. In addition, there was added to the initial mixture about 10 parts of 0.5 N aqueous sodium hydroxide solution as a catalyst for the reaction. The mixture was heated with stirring under reflux at boiling temperature for about 1 hour and 33 minutes. Hard films were obtained from the resulting solution by baking coatings thereof for 2 hours at 105° C. or at 120° C. The flexibility of films produced by baking at 105° C. was such that they could be bent about a ¾-inch mandrel without cracking.

The liquid composition of this example can be used as a component of laminating varnishes, as shown by the following: A melamine-formaldehyde resin was dissolved in a mixture of equal parts of water and alcohol to form a solution containing about 25% of resin solids. Two parts of this solution was then mixed with 1 part of the liquid composition of this example, which also contained about 25% of solids. Paper laminates were produced by impregnating paper with the resulting solution, and drying the impregnated sheets (16 in number) horizontally on a frame in a drier. The dried sheets containing about 58% of resin were superimposed and pressed together for 30 minutes at 155° C. under a pressure of 1000 pounds per square inch. The resulting laminate was glossy, translucent, rigid, had a Dynstat impact strength of 24 kilograms per square centimeter, and a Dynstat flexural strength of 1500 kilograms per square centimeter.

It will be understood, of course, by those skilled in the art that our invention is not limited to the specific reactants, proportions thereof and conditions of reaction given by way of illustration in the foregoing examples. For instance, in any of the examples wherein diethylene melamine has been used, we can employ an equivalent amount of triethylene melamine; also, in any of the examples wherein triethylene melamine has been utilized, we can use an equivalent amount of diethylene melamine; furthermore, in any of the examples wherein a single polyethylene melamine has been used, we can employ in lieu thereof a mixture of diethylene melamine and triethylene melamine in any proportions, as will be apparent to those skilled in the art. Likewise, hydroxy compounds other than those employed in the particular examples can be used as the co-reactant with the polyethylene melamine in producing the new synthetic materials of the present invention.

The hydroxy compound can be a monohydroxy compound or a polyhydroxy compound containing at least two and not more than six hydroxy groups per molecule. The monohydroxy compound can be, for instance, a compound represented by the general formula R—OH or by the general formula R'—(OR'')$_n$—OH. In these formulas R and R' each represents a monovalent hydrocarbon radical, R'' represents a member of the class consisting of divalent aliphatic hydrocarbon radicals and divalent aromatic-substituted aliphatic hydrocarbon radicals, and $n$ represents any positive integer, e. g., 1, 2, 3, 4, 5, 10, 20, 50, 100 or any higher number, the limit on the value of $n$ being governed only by the type of product wanted and the availability of the alcohol-ethers represented by the formula. Mixtures of monohydric alcohols represented by the aforementioned formulas can be used if desired. The hydroxy group in the compounds represented by the above formulas can be attached to a primary, secondary or tertiary carbon atom.

Illustrative examples of radicals represented by R in the formula R—OH and R' in the formula R'—(OR'')$_n$—OH are: monovalent aliphatic hydrocarbon radicals, e. g., methyl, ethyl, propyl, isopropyl, n-butyl, isobutyl, sec.-butyl, tert.-butyl, n-amyl, isoamyl, tert.-amyl, hexyl, heptyl, octyl, nonyl, decyl to octadecyl, inclusive, allyl, methallyl, ethallyl, crotyl, butenyl, isobutenyl, 2-butenyl, butynyl, oleyl, linalyl, etc., including cycloaliphatic, e. g., cyclopentyl, cyclopentenyl, cyclohexyl, cyclohexenyl, cycloheptyl, etc.; monovalent aromatic-substituted aliphatic hydrocarbon radicals, e. g., benzyl, cinnamyl, phenylethyl, phenylpropyl, phenylallyl and other aryl-substituted aliphatic hydrocarbon radicals corresponding to the examples of the monovalent unsubstituted aliphatic hydrocarbon radicals just mentioned; monovalent aromatic hydrocarbon radicals, e. g., phenyl, diphenyl or xenyl, naphthyl, etc.; and monovalent aliphatic-substituted aromatic hydrocarbon radicals, e. g., tolyl, xylyl, ethylphenyl, propylphenyl, isopropylphenyl, allylphenyl, etc. In brief, R and R' each represents any hydrocarbon radical including the lower alkyl radicals, e. g., methyl, ethyl, propyl, butyl, etc.

Illustrative examples of divalent radicals represented by R'' in the above formula for an alcohol-ether are: divalent aliphatic hydrocarbon radicals and divalent aromatic-substituted aliphatic hydrocarbon radicals corresponding to the examples of monovalent aliphatic hydrocarbon radicals and monovalent aromatic-substituted aliphatic hydrocarbon radicals mentioned above with reference to R and R'. Thus, R'' can represent divalent radicals such, for instance, as divalent aliphatic hydrocarbon radicals, e. g., ethylene, propylene (trimethylene), propenylene, butylene, isobutylene, pentylene, isopentylene, butenylene, hexylene, heptylene, octylene, nonylene, decylene to octadecylene, inclusive, including divalent cycloaliphatic hydrocarbon radicals, e. g., cyclopentylene, cyclohexylene, cyclohexenylene, cycloheptylene, etc.; and divalent aromatic-substituted aliphatic hydrocarbon radicals, e. g., phenylethylene, phenylpropylene, naphthylisobutylene, xylylene, etc.

More specific examples of hydroxy compounds that can be used in practicing the present invention, and whereby a new synthetic material is obtained by reaction of the hydroxy compound (or mixture thereof) with one or more polyethylene melamines, are listed below:

Methyl alcohol
Ethyl alcohol
Pentanol-2
Hexanol-3
Tolylcarbinol

Phenylmethylcarbinol
Diisopropylcarbinol
Lauryl alcohol
Cetyl alcohol
Ceryl alcohol
Methylvinylcarbinol
Cyclobutanol
Methylcyclobutanol
tert.-Butylcyclohexanol
Cyclohexanol-1,4
Cyclopentanol
Methylcyclopentanol
2,3-dimethyl benzyl alcohol
Propyl alcohol
Isopropyl alcohol
n-Butyl alcohol
Isobutyl alcohol
sec.-Butyl alcohol
tert.-Butyl alcohol
n-Amyl alcohol
tert.-Amyl alcohol
Hexyl alcohol
Decyl alcohol
Octadecyl alcohol
Allyl alcohol
Methallyl alcohol
Crotyl alcohol
Cyclohexyl alcohol
Benzyl alcohol
3-buten-1-ol
3-buten-2-ol
Phenylethyl alcohol
Ethylene glycol
Diethylene glycol
Triethylene glycol
Tetraethylene glycol
Hexamethylene glycol
Decamethylene glycol
2-ethyl-1,3-hexanediol
1,3-butylene glycol
Pentaethylene glycol
Heptaethylene glycol
Octaethylene glycol
Decaethylene glycol
2-butyl-1,3-octanediol (2-butyl-3-pentyl-1,3-propanediol)
2-ethyl-2-methylol-1-hexanol (2-ethyl-2-butyl-1,3-propanediol)
6-methyl-2,4-heptanediol (1-methyl-3-isobutyl-1,3-propanediol)
Glycerol
Erythritol
Pentaerythritol
Dipentaerythritol
Adonitol
Xylitol
Arabitol
Mannitol
Dulcitol
Sorbitol
Ethylene glycol monethyl ether
Ethylene glycol monobutyl ether
Ethylene glycol ethylbutyl ether
Ethylene glycol monophenyl ether
Ethylene glycol monotolyl ether
Ethylene glycol monobenzyl ether
Ethylene glycol monoallyl ether
Ethylene glycol monocyclohexyl ether
Propylene glycol monomethyl ether
Propylene glycol monethyl ether
Propylene glycol monobutyl ether
Propylene glycol monophenyl ether
Diethylene glycol monomethyl ether
Diethylene glycol monoethyl ether
Diethylene glycol monobutyl ether
Pentylene glycol monomethyl ether
Isopentylene glycol monoethyl ether
Decylene glycol monophenyl ether
Dibutylene glycol monopropyl ether
Phenylethylene glycol monobutyl ether
Phenol ($C_6H_5OH$)
o-, m- and p-Cresols
Xylenols
Ethylphenols
Butylphenols
p-Tertiary-amylphenol
Mesitol
Thymol
Resorcinol
Wax-substituted phenols Other examples of hydroxy compounds that can be used will be apparent to those skilled in the art from the foregoing examples. Mixtures of any of the aforementioned hydroxy compounds (as well as others) in any proportions and in any total number, as desired or as conditions may require, can be used as a co-reactant with diethylene melamine alone, or with triethylene melamine alone, or with a mixture of diethylene melamine and triethylene melamine in any proportions.

The reaction between the polyethylene melamine and the hydroxy compound can be accelerated in some cases by using a small amount of a catalyst or a catalytic reactant to accelerate the reaction. Alkali-metal hydroxides e. g., sodium or potassium hydroxide, etc., can be used for this purpose. Good results have been obtained by using a catalytic reactant such as an amine, e. g., n-butylamine, when the reaction between the polyethylene melamine and the hydroxy compound does not proceed as rapidly as is desired. Other amines (as well as other nitrogenous compounds) that can be used for this purpose are given in our aforementioned copending application Serial No. 197,637. Such nitrogenous compounds (amines, amides, etc.) also can be employed as a component of the reaction mass in proportions in excess of the amount normally used as a catalyst for the reaction, for instance, in a molar amount equal to or greater than the amount of hydroxy reactant employed. Or, a catalytic amount of the nitrogenous compound may be employed, e. g., from 0.01 to 20 mols per cent of the polyethylene melamine reactant.

The properties of the fundamental resinous or non-resinous reaction products of this invention can be varied widely by introducing other modifying bodies before, during or after effecting reaction between the primary components. For instance, we can incorporate into the fundamental reaction products, during their preparation or after they have been formed, such modifiers as melamine-aldehyde condensation products (e. g., melamine-formaldehyde condensation products), urea-aldehyde condensation products (e. g., urea-formaldehyde condensation products), urea-melamine-aldehyde condensation products (e. g., urea-melamine-formaldehyde condensation products), protein-aldehyde condensation products, aminodiazine-aldehyde condensation products, aminotriazole-aldehyde condensation products, aniline-aldehyde condensation products, phenol-aldehyde condensation products (e. g., phenol-formaldehyde condensation products), furfural condensation products, modified or unmodified, saturated or unsaturated polyhydric alcohol-polycarboxylic acid reaction products, ester gums, water-soluble cellulose derivatives, natural gums and resins such as shellac, rosin, etc., polyvinyl compounds such as polyvinyl alcohol, polyvinyl esters (e. g., polyvinyl acetate, polyvinyl butyrate, etc.), polyvinyl ethers, including polyvinyl acetals, e. g., polyvinyl formal, polyvinyl butyral, etc.

Coating compositions may be prepared from the thermosetting or potentially thermosetting resinous compositions of this invention alone or admixed with melamine-formaldehyde resins, fatty oil or fatty oil acid-modified alkyd resins, or other film-forming materials commonly used in protective coating compositions. For example, a coating composition may be made containing, for instance, from 15 to 95 parts by weight of a thermosetting or potentially thermosetting resin of the kind with which this invention is concerned and from 85 to 5 parts of a fatty oil or fatty oil acid-modified alkyd resin, numerous examples of which are given, for example in Moore Patent No. 2,218,474, issued October 15, 1940.

Dyes, pigments, driers, curing agents (in some cases where a more accelerated cure is desired), plasticizers, mold lubricants, opacifiers and various fillers (e. g., wood flour, glass fibers, asbestos, mineral wool, mica dust, powdered quartz, titanium dioxide, zinc oxide, talc, China clay, carbon black, etc.) may be compounded by conventional practice with the synthetic materials of our invention, as desired or as conditions may require, in order to provide a coating, molding or other composition best adapted to meet a particular service use. For additional and more detailed information concerning the modifying ingredients that may be employed in producing coating compositions from our new resins, reference is made to the aforementioned Moore patent.

The modified and unmodified reaction products, more particularly resinous reaction products, of this invention have a wide variety of uses. For example, in addition to their use in the production of coating and molding compositions, they may be employed as modifiers of other natural and synthetic resins. Thus, some of them advantageously may be used to improve the plasticity or flow characteristics of thermosetting resins which have insufficient or unsatisfactory plasticity during curing to an insoluble, infusible state, e. g., certain urea-formaldehyde or melamine-formaldehyde resins or molding compositions where better flow during molding, without decreasing the cure time, is desirable. The soluble resins of this invention also can be dissolved in appropriate solvents. Some of the solvents that may be employed to dissolve a particular reaction product of our invention include benzene, toluene, xylene, amyl acetate, butanol, methyl ethyl ketone, etc. The dissolved resins can be used as laminating varnishes in the production of laminated articles wherein sheet materials, e. g., paper, cloth, sheet asbestos, etc., are coated or coated and impregnated with the resin solution, superimposed and thereafter united under heat and pressure. They also can be employed as an adhesive in making laminated plywood, as an impregnant of pulp preforms from which molded articles thereafter are made by subjecting the impregnated preform to heat and pressure, as impregnants for electrical coils and for other electrically insulating applications, for bonding together abrasive grains in the production of resin-bonded abrasive articles such, for instance, as grindstones, sand papers, etc., in the manufacture of electrical resistors, etc. They also can be used for treating textile materials (e. g., cotton, linen, rayon and other cellulose-containing textiles, wool, silk and other natural or synthetic proteinaceous materials, including nylon and textiles derived from polyacrylonitrile and acrylonitrile copolymers, and from casein, soya beans, etc.), in filament, thread, yarn, fabric (woven or felted) or other form, in order to improve the properties of such textile materials, e. g., to increase the stiffness, to increase the service life, to impart shrinkage resistance thereto, or otherwise to improve the properties of the treated materials and to make them more useful or serviceable to the ultimate user. They also may be employed for treating leather in order to improve its appearance and physical properties.

We claim:

1. A composition comprising the product of reaction of ingredients comprising (1) a polyethylene melamine which is a polyamino-s-triazine wherein at least two of the amino nitrogen atoms each has one ethylene group attached thereto instead of the two hydrogen atoms and (2) a hydroxy compound which contains carbon having bonded directly thereto at least one and not more than six hydroxy groups per molecule, said hydroxy component of the said compound being the only substituent which is reactive with the said polyethylene melamine.

2. A composition as in claim 1 wherein the hydroxy compound of (2) has a single hydroxy group bonded directly to a carbon atom thereof.

3. A composition as in claim 1 wherein the hydroxy compound of (2) contains carbon having bonded directly thereto at least two and not more than six hydroxy groups per molecule.

4. A composition as in claim 1 wherein the polyethylene melamine of (1) is diethylene melamine, the formula for which is

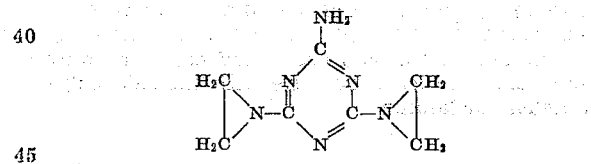

5. A composition as in claim 1 wherein the polyethylene melamine of (1) is triethylene melamine, the formula for which is

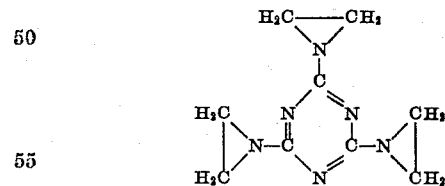

6. A composition comprising the product of reaction of ingredients comprising (1) a polyethylene melamine which is a polyamino-s-triazine wherein at least two of the amino nitrogen atoms each has one ethylene group attached thereto instead of the two hydrogen atoms and (2) an alcohol represented by the formula R—OH where R represents a monovalent hydrocarbon radical.

7. A composition as in claim 6 wherein R in the formula for the alcohol of (2) represents a lower alkyl radical.

8. A composition comprising the product of reaction of ingredients comprising (1) a polyethylene melamine which is a polyamino-s-triazine wherein at least two of the amino nitrogen atoms each has one ethylene group attached thereto instead of the two hydrogen atoms and (2) an alcohol-ether represented by the formula R'—(OR'')$_n$—OH where R' represents a monovalent hydrocarbon radical, R'' represents a member of the class consisting of divalent aliphatic hydrocarbon radicals and divalent aromatic-substituted aliphatic hydrocarbon radicals, and $n$ represents a positive integer.

9. A composition as in claim 8 wherein the alcohol-ether of (2) is ethylene glycol monoethyl ether.

10. A composition comprising the product of reaction of ingredients comprising (1) a polyethylene melamine which is a polyamino-s-triazine wherein at least two of the amino nitrogen atoms each has one ethylene group attached thereto instead of the two hydrogen atoms and (2) a glycol.

11. A composition comprising the product of reaction of ingredients comprising (1) a polyethylene melamine which is a polyamino-s-triazine wherein at least two of the amino nitrogen atoms each has one ethylene group attached thereto instead of the two hydrogen atoms and (2) glycerol.

12. A composition comprising the product of reaction of ingredients comprising (1) a polyethylene melamine which is a polyamino-s-triazine wherein at least two of the amino nitrogen atoms each has one ethylene group attached thereto instead of the two hydrogen atoms and (2) phenol.

13. A heat-curable composition comprising the heat-convertible resinous product of reaction of ingredients comprising (1) polyethylene melamine which is a polyamino-s-triazine wherein at least two of the amino nitrogen atoms each has one ethylene group attached thereto instead of the two hydrogen atoms and (2) a hydroxy compound which contains carbon having bonded directly thereto at least one and not more than six hydroxy groups per molecule, said hydroxy component of the said compound being the only substituent which is reactive with the said polyethylene melamine.

14. A product comprising the cured composition of claim 13.

15. The method of preparing a new synthetic material which comprises effecting reaction, at a temperature ranging between room temperature and a temperature below the temperature of decomposition of the reaction product, between ingredients comprising (1) a polyethylene melamine which is a polyamino-s-triazine wherein at least two of the amino nitrogen atoms each has one ethylene group attached thereto instead of the two hyrdogen atoms and (2) a hydroxy compound which contains carbon having bonded directly thereto at least one and not more than six hydroxy groups per molecule, said hydroxy component of the said compound being the only substituent which is reactive with the said polyethylene melamine.

16. A method as in claim 15 wherein the reaction between the ingredients of (1) and (2) is effected in the presence of a small amount of an amine as a catalytic reactant to accelerate the reaction.

17. A method as in claim 15 wherein the reaction is effected by heating a liquid medium containing the ingredients of (1) and (2) and in which the said ingredients are inert, said reaction being effected at a temperature not exceeding the boiling temperature of the reaction mass.

HENRY P. WOHNSIEDLER.
EDWARD L. KROPA.

REFERENCES CITED

The following references are of record in the file of this patent:

UNITED STATES PATENTS

| Number | Name | Date |
|---|---|---|
| 2,524,727 | Dudley | Oct. 30, 1950 |

OTHER REFERENCES

Smith: Synthetic Fiber Developments in Germany (Textile Research Inst.) 1946, pp. 27-29.